(12) United States Patent
Huntington et al.

(10) Patent No.: US 10,502,484 B2
(45) Date of Patent: Dec. 10, 2019

(54) SYSTEM AND METHOD FOR LIQUEFYING NATURAL GAS WITH TURBINE INLET COOLING

(71) Applicants: Richard A. Huntington, Spring, TX (US); Paul W. Sibal, The Woodlands, TX (US); Michael T. Matheidas, The Woodlands, TX (US)

(72) Inventors: Richard A. Huntington, Spring, TX (US); Paul W. Sibal, The Woodlands, TX (US); Michael T. Matheidas, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 217 days.

(21) Appl. No.: 15/661,305

(22) Filed: Jul. 27, 2017

(65) Prior Publication Data

US 2018/0051928 A1    Feb. 22, 2018

Related U.S. Application Data

(60) Provisional application No. 62/375,700, filed on Aug. 16, 2016.

(51) Int. Cl.
*F25J 1/02* (2006.01)
*F25J 1/00* (2006.01)
*F25J 3/02* (2006.01)

(52) U.S. Cl.
CPC .......... *F25J 1/0283* (2013.01); *F25J 1/0022* (2013.01); *F25J 1/0055* (2013.01); *F25J 1/0087* (2013.01);

(Continued)

(58) Field of Classification Search
CPC ........ F25J 1/0283; F25J 1/0022; F25J 1/0055; F25J 1/0087; F25J 1/0216; F25J 1/029;

(Continued)

(56) References Cited

U.S. PATENT DOCUMENTS

| 5,473,900 A | 12/1995 | Low .................................. 62/9 |
| 6,324,867 B1 | 12/2001 | Fanning et al. ................ 62/613 |

(Continued)

OTHER PUBLICATIONS

Kikkawa, Yoshitsugi et al. (2013) "Minimizing the CO2 Emission from the Liquefaction Plant," *17th Int'l Conf. & Exh. On LNG 17*, Apr. 17, 2013, 25 pgs.

*Primary Examiner* — Melvin Jones
(74) *Attorney, Agent, or Firm* — ExxonMobil Upstream Research Company—Law Department

(57) ABSTRACT

A system and method for processing natural gas to produce liquefied natural gas is disclosed. The natural gas is cooled in one or more heat exchangers using a first refrigerant from a first refrigerant circuit in which the first refrigerant is compressed in a first compressor driven by a first gas turbine having a first inlet air stream. The natural gas is liquefied using a second refrigerant, the second refrigerant being compressed in a second compressor driven by a second gas turbine having a second inlet air stream. At least one of the inlet air streams is chilled from about the respective dry bulb temperature to a temperature below the respective wet bulb temperature. Water contained in at least one of the chilled first and second air streams is condensed and separated therefrom. At least a portion of the first refrigerant is condensed or sub-cooled using the separated water.

19 Claims, 5 Drawing Sheets

(52) U.S. Cl.
 CPC .............. *F25J 1/029* (2013.01); *F25J 1/0216* (2013.01); *F25J 1/0297* (2013.01); *F25J 3/0233* (2013.01); *F25J 2215/60* (2013.01); *F25J 2215/62* (2013.01); *F25J 2215/64* (2013.01); *F25J 2215/66* (2013.01); *F25J 2230/22* (2013.01); *F25J 2270/60* (2013.01); *F25J 2270/66* (2013.01)

(58) Field of Classification Search
 CPC ...... F25J 1/0287; F25J 3/0233; F25J 2251/62; F25J 2215/64; F25J 2215/66; F25J 2230/22; F25J 2270/60; F25J 2270/66
 See application file for complete search history.

(56) References Cited

U.S. PATENT DOCUMENTS

| | | | |
|---|---|---|---|
| 6,691,531 B1* | 2/2004 | Martinez | F25J 1/0282 62/612 |
| 7,946,127 B2 | 5/2011 | Fountain | 62/612 |
| 8,534,039 B1 | 9/2013 | Pierson et al. | 60/39 |
| 9,057,288 B2 | 6/2015 | Pierson et al. | 60/39 |
| 2012/0060552 A1* | 3/2012 | Van De Lisdonk | F01D 15/005 62/611 |
| 2012/0167618 A1 | 7/2012 | Huang et al. | 62/613 |
| 2015/0013379 A1* | 1/2015 | Oelfke | F25J 1/0022 62/612 |
| 2016/0230711 A1* | 8/2016 | Huntington | F02C 3/04 |
| 2016/0238312 A1 | 8/2016 | Kakutani et al. | 62/611 |

\* cited by examiner

SYSTEM AND METHOD FOR LIQUEFYING NATURAL GAS WITH TURBINE INLET COOLING

REFERENCE TO RELATED APPLICATIONS

This application claims the priority benefit of U.S. patent application Ser. No. 62/375,700 filed Aug. 16, 2016 entitled SYSTEM AND METHOD FOR LIQUEFYING NATURAL GAS WITH TURBINE INLET COOLING, the entirety of which is incorporated by reference herein.

This application is related to U.S. Provisional Patent Application No. 62/375,705 filed Aug. 16, 2016 entitled "SYSTEM AND METHOD TO INTEGRATE CONDENSED WATER WITH IMPROVED COOLER PERFORMANCE", having a common assignee as this application and filed on the same day herewith. The disclosure of this related application is incorporated by reference herein in its entirety.

BACKGROUND

Field of Disclosure

The disclosure relates generally to hydrocarbon processing, and more particularly, to the liquefaction of natural gas.

Description of Related Art

This section is intended to introduce various aspects of the art, which may be associated with the present disclosure. This discussion is intended to provide a framework to facilitate a better understanding of particular aspects of the present disclosure. Accordingly, it should be understood that this section should be read in this light, and not necessarily as an admission of prior art.

Many liquefied natural gas (LNG) production facilities operating now use combustion gas turbines to drive the compressors needed to refrigerate the natural gas from a gaseous to a liquid state. LNG production facilities typically use two or more refrigeration circuits to at least pre-chill the incoming natural gas and then to liquefy it. Often the use of the various refrigeration circuits in these facilities is not optimized and spare refrigeration capacity in one or more of the refrigeration circuits cannot be fully used for all operating conditions. Operating at a wide range of ambient temperatures may be a factor that can result in such an imbalance of the various refrigeration circuits.

Further, the combustion gas turbine drivers are also sensitive to ambient temperature and can lose about 0.7% of available power for each 1 degree Celsius increase of the ambient temperature. This means that most LNG plants have to be significantly overdesigned to ensure the required horsepower is available regardless of ambient temperature.

U.S. Pat. No. 6,324,867 to Fanning, et al. describes a system and method to liquefy natural gas that utilizes the excess refrigeration capacity in one refrigeration circuit to chill the inlet air for the gas turbine driver or drivers of another refrigeration circuit and thus increase the overall capacity of the LNG plant. The disclosure of Fanning is incorporated by reference herein in its entirety. By maintaining the inlet air for the turbines at a substantially constant low temperature, the amount of power generated by the turbines remains at a high level regardless of the ambient air temperature. This allows the LNG plant to be designed for more capacity and allows the plant to operate at a substantially constant production rate throughout the year. Further, since the system of Fanning uses the first refrigerant circuit, for example a circuit comprising propane as a refrigerant, already present in LNG systems of this type, no addition cooling source is required.

U.S. Pat. No. 8,534,039 to Pierson, et al. describes using moisture condensed via gas turbine inlet air chilling for psychometric cooling to improve the performance of an organic Rankine cycle condenser and refrigerant condenser. This refrigerant condenser is part of the system that provides the gas turbine inlet air chilling. In Pierson, the condensed moisture is collected in a basin located below a wet air fin cooler and a pump sprays the collected water onto the tubes of the air fin. Pierson also describes adding makeup water to maintain a minimum level in the basin. It is desired, however, to provide a such a cooling system that does not require the use of a basin as disclosed in Pierson, and that minimizes possible contamination of the cooling water from atmospheric contaminants.

SUMMARY

The present disclosure provides a method for processing natural gas to produce liquefied natural gas. The natural gas is cooled in one or more heat exchangers using a first refrigerant from a first refrigerant circuit in which the first refrigerant is compressed in a first compressor driven by a first gas turbine having a first inlet air stream. The first inlet air stream has a dry bulb temperature and a wet bulb temperature. The natural gas is liquefied using a second refrigerant. The second refrigerant is compressed in a second compressor driven by a second gas turbine having a second inlet air stream. The second inlet air stream has a dry bulb temperature and a wet bulb temperature. At least one of the first and second inlet air streams is chilled from about the respective dry bulb temperature to a temperature below the respective wet bulb temperature. The chilling of at least one of the first and second inlet air streams uses the first refrigerant from the first refrigerant circuit. Water contained in at least one of the chilled first and second air streams is condensed. The condensed water is separated from the at least one of the first and second air streams. At least a portion of the first refrigerant is condensed or sub-cooled using the separated water.

The present disclosure also provides a system for processing natural gas to produce liquefied natural gas. The system includes one or more heat exchangers. A first refrigerant is configured to cool the natural gas in the one or more heat exchangers. A first compressor is driven by a first gas turbine. The first compressor is configured to compress the first refrigerant. The first compressor has a first inlet air stream. The first inlet air stream has a dry bulb temperature and a wet bulb temperature associated therewith. A second refrigerant is configured to liquefy the cooled natural gas in a cryogenic heat exchanger. A second compressor is driven by a second gas turbine and is configured to compress the second refrigerant. The second compressor has a second inlet air stream. The second inlet air stream has a dry bulb temperature and a wet bulb temperature associated therewith. A chiller is located at an inlet of each of at least one of the first and second gas turbines. The cooler is configured to chill, using the first refrigerant, at least one of the first and second inlet air streams from about the respective dry bulb temperature to a temperature below the respective wet bulb temperature. A separator is located downstream of each chiller and is configured to separate water in the chilled at least one of the first and second inlet air streams. A wet air fin cooler combines the separated water with an air stream to condense or sub-cool at least a portion of the first refrigerant passing through the wet air fin cooler.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

Figure 1:
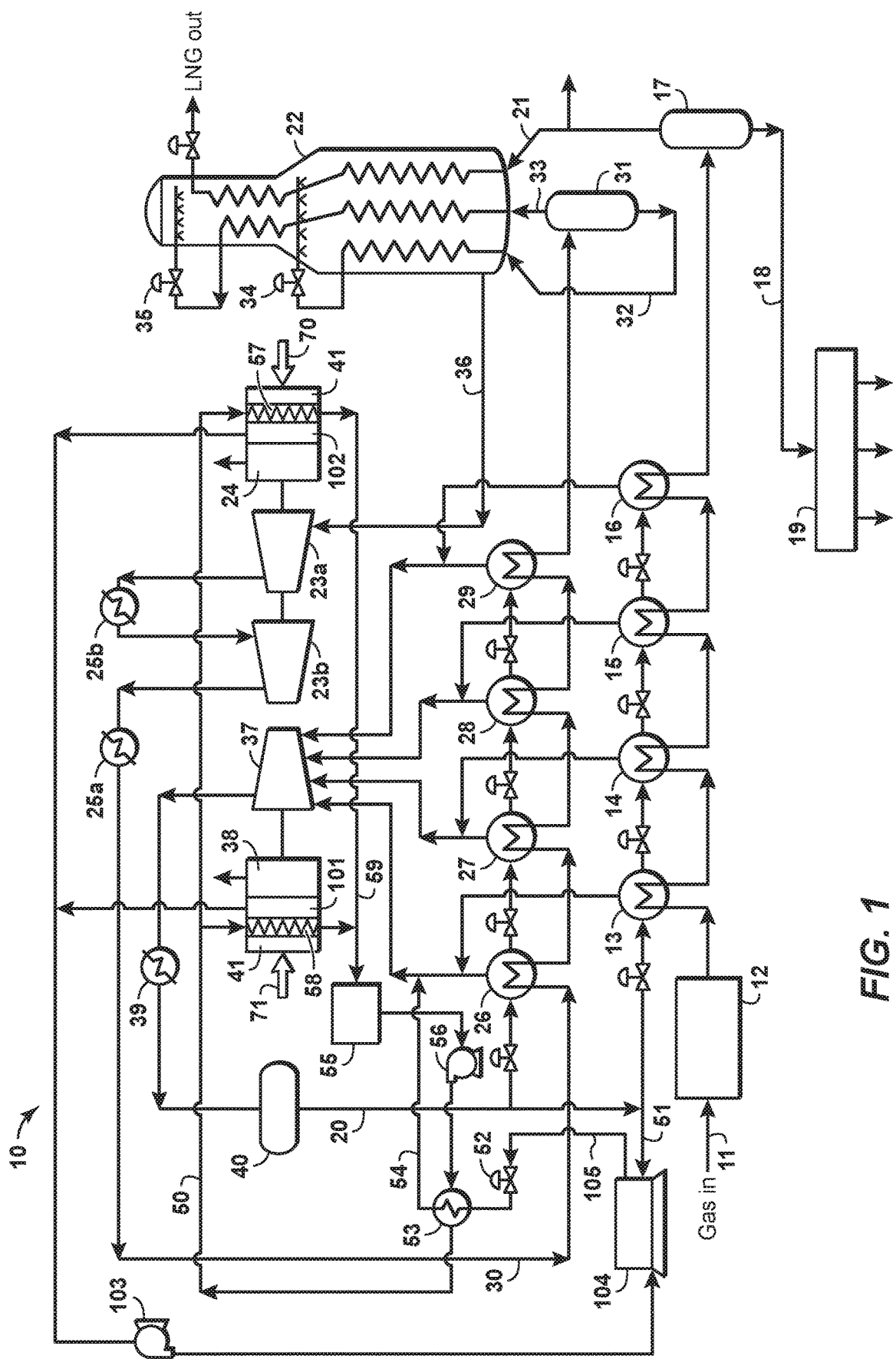
FIG. 1 is a schematic diagram of an LNG liquefaction system according to aspects of the present disclosure.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

To promote an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. For the sake of clarity, some features not relevant to the present disclosure may not be shown in the drawings.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As one of ordinary skill would appreciate, different persons may refer to the same feature or component by different names. This document does not intend to distinguish between components or features that differ in name only. The figures are not necessarily to scale. Certain features and components herein may be shown exaggerated in scale or in schematic form and some details of conventional elements may not be shown in the interest of clarity and conciseness. When referring to the figures described herein, the same reference numerals may be referenced in multiple figures for the sake of simplicity. In the following description and in the claims, the terms "including" and "comprising" are used in an open-ended fashion, and thus, should be interpreted to mean "including, but not limited to."

The articles "the," "a" and "an" are not necessarily limited to mean only one, but rather are inclusive and open ended so as to include, optionally, multiple such elements.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

The term "heat exchanger" refers to a device designed to efficiently transfer or "exchange" heat from one matter to another. Exemplary heat exchanger types include a co-current or counter-current heat exchanger, an indirect heat exchanger (e.g. spiral wound heat exchanger, plate-fin heat exchanger such as a brazed aluminum plate fin type, shell-and-tube heat exchanger, etc.), direct contact heat exchanger, or some combination of these, and so on.

The present disclosure is a system and method to liquefy natural gas that uses the excess refrigeration capacity in one refrigeration circuit to chill the inlet air for the gas turbine driver or drivers of another refrigeration circuit and thus increase the overall capacity of the LNG plant. The present invention improves upon previous solutions in which moisture condensed via gas turbine inlet air chilling is used for psychometric cooling to improve the performance of a refrigerant condenser that forms part of the system that provides the gas turbine inlet air chilling. Such previous solutions collected condensed moisture in a basin located below a wet air fin cooler and sprayed the collected water onto the tubes of the air fin. According to aspects of the present disclosure, no basin is required to collect condensed moisture, and essentially all of the moisture collected from the gas turbine inlet air chilling system is subsequently vaporized within the wet air fin air stream to minimize overspray. The condensed moisture is collected downstream of at least one air filter element within the gas turbine air inlet to minimize contamination of the water by atmospheric contaminants. Each of these measures is intended to minimize the risk of corrosion and fouling of the wet air fin device, the gas turbine inlet air chiller and the gas turbine inlet air moisture separation device. Furthermore, optional control of the air flow to the wet air fin via adjustable fan speed, pitch, louvers, or the like, can be used to improve the air fin performance by trading between lower air temperature due to psychometric cooling at lower air flows and velocities vs. higher air temperature and higher velocities.

The present disclosure improves upon known cooling systems by sub-cooling the refrigerant slipstream used for gas turbine inlet air chilling, and further by using psychometric cooling using moisture condensed during the inlet air chilling to improve the performance of this refrigerant sub-cooling.

Figure 2:
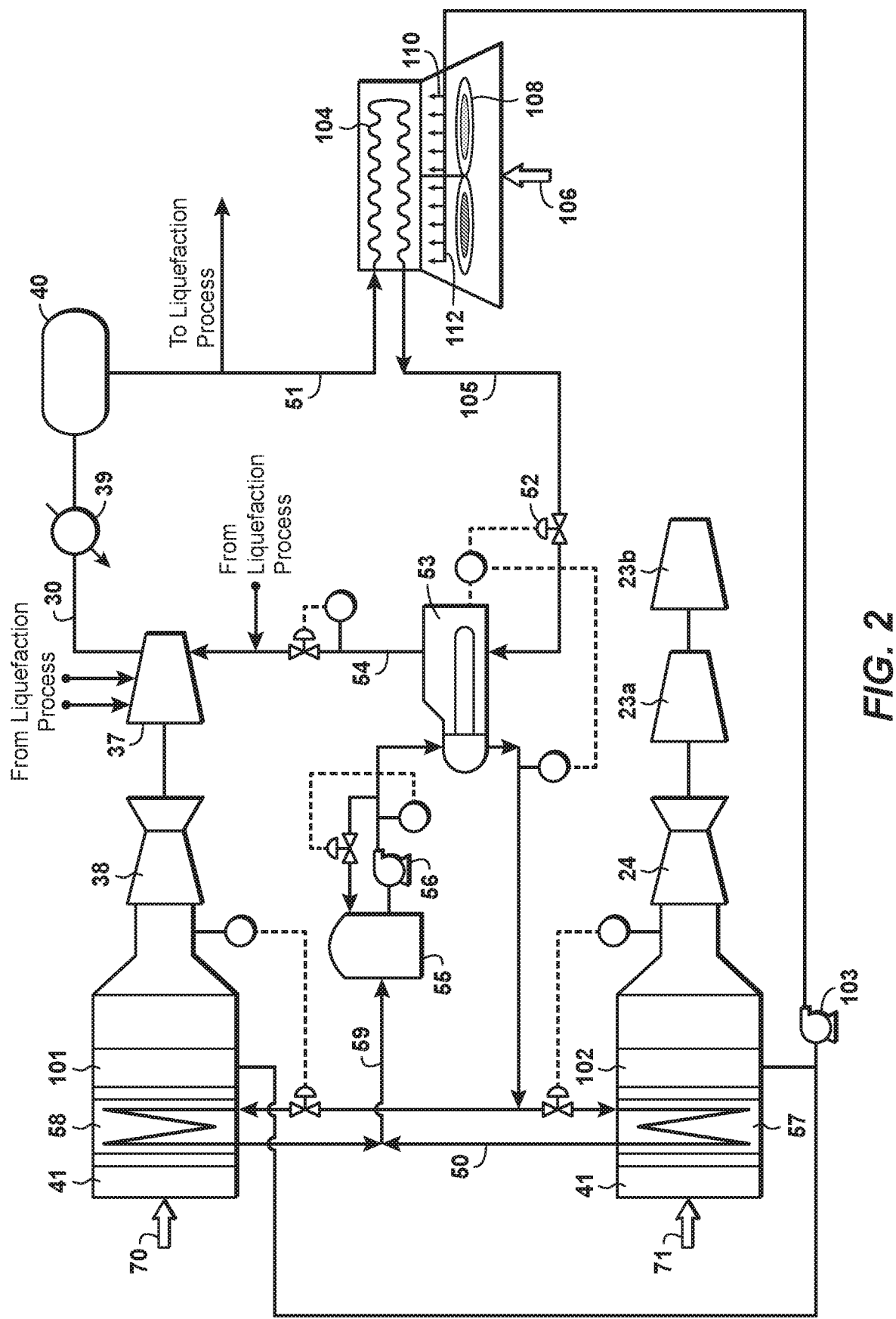
FIG. 2 is a schematic diagram of a detail of FIG. 1 according to aspects of the present disclosure.

FIGS. 1 and 2 illustrate a system 10 and process for liquefying natural gas (LNG) according to aspects of the present disclosure. In system 10, feed gas (natural gas) enters through an inlet line 11 into a preparation unit 12 where it is treated to remove contaminants. The treated gas then passes from preparation unit 12 through a series of heat exchangers 13, 14, 15, 16, where it is cooled by evaporating the first refrigerant (e.g. propane) which, in turn, is flowing through the respective heat exchangers through a first refrigeration circuit 20. The cooled natural gas then flows to fractionation column 17 wherein pentanes and heavier hydrocarbons are removed through line 18 for further processing in a fractionating unit 19.

The remaining mixture of methane, ethane, propane, and butane is removed from fractionation column 17 through line 21 and is liquefied in the main cryogenic heat exchanger 22 by further cooling the gas mixture with a second refrigerant that may comprise a mixed refrigerant (MR) which flows through a second refrigerant circuit 30. The second refrigerant, which may include at least one of nitrogen, methane, ethane, and propane, is compressed in compressors 23a, 23b which, in turn, are driven by a gas turbine 24. After compression, the second refrigerant is cooled by passing through air or water coolers 25a, 25b and is then partly condensed within heat exchangers 26, 27, 28, and 29 by the evaporating the first refrigerant from first refrigerant circuit 20. The second refrigerant may then flow to a high pressure separator 31, which separates the condensed liquid portion of the second refrigerant from the vapor portion of the second refrigerant. The condensed liquid and vapor portions of the second refrigerant are output from the high pressure separator 31 in lines 32 and 33, respectively. As seen in FIG. 1, both the condensed liquid and vapor from high pressure separator 31 flow through main cryogenic heat exchanger 22 where they are cooled by evaporating the second refrigerant.

The condensed liquid stream in line 32 is removed from the middle of main cryogenic heat exchanger 22 and the pressure thereof is reduced across an expansion valve 34. The now low pressure second refrigerant is then put back into the main cryogenic heat exchanger 22 where it is evaporated by the warmer second refrigerant streams and the feed gas stream in line 21. When the second refrigerant vapor stream reaches the top of the main cryogenic heat exchanger 22, it has condensed and is removed and expanded across an expansion valve 35 before it is returned to the main cryogenic heat exchanger 22. As the condensed second refrigerant vapor falls within the main cryogenic heat exchanger 22, it is evaporated by exchanging heat with the feed gas in line 21 and the high pressure second refrigerant stream in line 32. The falling condensed second refrigerant vapor mixes with the low pressure second refrigerant liquid stream within the middle of the main cryogenic heat exchanger 22 and the combined stream exits the bottom of the main cryogenic heat exchanger 22 as a vapor through outlet 36 to flow back to compressors 23a, 23b to complete second refrigerant circuit 30.

The closed first refrigeration circuit 20 is used to cool both the feed gas and the second refrigerant before they pass through main cryogenic heat exchanger 22. The first refrigerant is compressed by a compressor 37 which, in turn, is powered by a gas turbine 38. The first refrigerant compressor 37 may comprise at least one compressor casing and the at least one casing may collectively comprise at least two inlets to receive at least two first refrigerant streams at different pressure levels. The compressed first refrigerant is condensed in one or more condensers or coolers 39 (e.g. seawater or air cooled) and is collected in a first refrigerant surge tank 40 from which it is cascaded through the heat exchangers (propane chillers) 13, 14, 15, 16, 26, 27, 28, 29 where the first refrigerant evaporates to cool both the feed gas and the second refrigerant, respectively. Both gas turbine systems 24 and 38 may comprise air inlet systems that in turn may comprise air filtration devices, moisture separation devices, chilling and/or heating devices or particulate separation devices.

Means may be provided in system 10 of FIG. 1 for cooling the inlet air 70, 71 to both gas turbines 24 and 38 for improving the operating efficiency of the turbines. Basically, the system may use excess refrigeration available in system 10 to cool an intermediate fluid, which may comprise water, glycol or another heat transfer fluid, that, in turn, is circulated through a closed, inlet coolant loop 50 to cool the inlet air to the turbines.

Referring to FIG. 2, to provide the necessary cooling for the inlet air 70, 71, a slip-stream of the first refrigerant is withdrawn from the first refrigeration circuit 20 (i.e. from surge tank 40) through a line 51 and is flashed across an expansion valve 52. Since first refrigeration circuit 20 is already available in gas liquefaction processes of this type, there is no need to provide a new or separate source of cooling in the process, thereby substantially reducing the costs of the system. The expanded first refrigerant is passed from expansion valve 52 and through a heat exchanger 53 before it is returned to first refrigeration circuit 20 through a line 54. The propane evaporates within heat exchanger 53 to thereby lower the temperature of the intermediate fluid which, in turn, is pumped through the heat exchanger 53 from a storage tank 55 by pump 56.

The cooled intermediate fluid is then pumped through air chillers or coolers 57, 58 positioned at the inlets for turbines 24, 38, respectively. As inlet air 70, 71 flows into the respective turbines, it passes over coils or the like in the air chillers or coolers 57, 58 which, in turn, cool the inlet air 70, 71 before the air is delivered to its respective turbine. The warmed intermediate fluid is then returned to storage tank 55 through line 59. Preferably, the inlet air 70, 71 will be cooled to no lower than about 5° Celsius (41° Fahrenheit) since ice may form at lower temperatures. In some instances, it may be desirable to add an anti-freeze agent (e.g. ethylene glycol) with inhibitors to the intermediate fluid to prevent plugging, equipment damage and to control corrosion.

One aspect of the present disclosure is illustrated in detail in FIG. 2. FIG. 2 adds a wet air fin cooler 104 is connected to the first refrigeration circuit 20. As used with the present disclosure, wet air fin cooler 104 combines the cooling effectiveness of (a) a conventional air fin heat exchanger, which may use a fan 108 to pass ambient air over finned tubes through which pass the fluid (e.g. liquid or gas) to be cooled to near ambient temperature (e.g. dry bulb temperature), with (b) psychometric cooling by vaporizing a liquid, typically water, within the ambient air stream using, for example, nozzles 110 in a spray header 112, to approach the lower wet bulb temperature of the ambient air.

Wet air fin cooler 104 is used to sub-cool the slip-stream of liquid first refrigerant in line 51 from surge tank 40. The sub-cooled first refrigerant is directed through line 105 to heat exchanger 53. Sub-cooling this propane increases both the refrigeration duty of heat exchanger 53 and the coefficient of performance of the refrigeration system. This coefficient of performance is the ratio of the refrigeration duty of the heat exchanger 53 divided by the incremental compressor power to provide that refrigeration. The wet air fin cooler 104 is positioned to cool the slip-stream of first refrigerant in line 51 in FIGS. 1 and 2. Alternatively, the wet air fin cooler 104 could be incorporated as part of the one or more condensers or coolers 39 to sub-cool liquid propane that serves the other parts of the liquefaction process before the slip-stream of first refrigerant in line 51 is removed to provide a source of cooling (direct or indirect) to air chillers or coolers 57, 58. However, it is preferred to sub-cool only the slip-stream of propane in line 51 to maximize the benefit with respect to gas turbine inlet air chilling.

According to disclosed aspects, separators 101 and 102 are positioned in the gas turbine air inlet following the air chillers or coolers 58, 57, respectively. These separators 101, 102 remove the water that is condensed from the inlet air 70, 71 as the inlet air is cooled from its ambient dry bulb temperature to a temperature below its wet bulb temperature. Separators 101, 102 may be of the inertial type, such as vertical vane, coalescing elements, a low velocity plenum, or a moisture separator known to those skilled in the art. The gas turbine air inlet may include filtration elements, such as air filters 41, that may be located either upstream or downstream or both up and downstream of the air chillers or coolers 57, 58 and the separators 101, 102, respectively. Preferably, at least one filtration element is located upstream of the chiller(s) and separator(s). This air filtration element may include a moisture barrier, such as an ePTFE (expanded PTFE) membrane which may be sold under the GORETEX trademark, to remove atmospheric mist, dust, salts or other contaminants that may be concentrated in the condensed water removed by separators 101, 102. By locating at least one filtration element or similar device upstream of the chiller and separator associated with gas turbines 24 and/or 38, atmospheric contaminants in the collected moisture (water) can be minimized, fouling and corrosion of the chiller(s) and separator(s) can be minimized, and fouling and corrosion of the wet air fin cooler 104 can also be controlled and minimized.

During the chilling of the gas turbine inlet air 70, 71, a significant portion of the refrigeration duty is used to condense the moisture in the gas turbine inlet air 70, 71 rather than simply reducing the dry bulb temperature of the inlet air. As an example, if inlet air with a dry bulb temperature of 40° Celsius and a wet bulb temperature of 24° Celsius is chilled, the effective specific heat of the air is about 1 kJ/kg/° C. between 40° C. and 24° C. but increases dramatically to about 3 kJ/kg/° C. below the wet bulb temperature of 24° C. as the dry bulb temperature is reduced and moisture is condensed from the air. From this, one could conclude that about two-thirds of the refrigeration duty used to chill the air below the wet bulb temperature (dew point) is wasted since the small compositional change of the air to the gas turbine 24 and/or 38 has only a small effect on the available power of the gas turbine. This condensed moisture is essentially at the same temperature as the chilled inlet air to the gas turbine and could be used to provide some precooling of the inlet air 70, 71 using another chilling coil similar to air chillers or coolers 57 or 58 that is positioned ahead of the air chillers or coolers 57 or 58 in the air flow. However, this arrangement can only recoup the part of the refrigeration duty used to reduce the temperature of the water but not the part used to condense it. That is, the heat of vaporization of the water cannot be recouped by heat transfer or psychometric cooling with the gas turbine inlet air.

A much greater portion of the refrigeration duty used to cool and condense the moisture from the gas turbine inlet air 70, 71 can be recouped by collecting this chilled water from separators 101 or 102, pumping it with a pump 103 and spraying the water onto the tubes of the wet air fin cooler 104 or otherwise mixing the water with the air flow 106 to the wet air fin cooler 104. Based on the ambient conditions and the actual flow rate of air conveyed by the fan associated with the wet air fin cooler 104, the water pumped by pump 103 may be sufficient to saturate the air flow of wet air fin cooler 104 and bring it to its wet bulb temperature. Excess water flow from separators 101, 102 may be available that could be used for another purpose, or may be insufficient to saturate the air flow. In this later case, additional water from another source may be provided.

An example of the effectiveness of the use of water collected from separators 101 or 102 to improve the air inlet cooling is shown in Table 1. The three columns show the impact of no cooler such as wet air fin cooler 104, an air fin cooler with no water spray, and a wet air fin cooler 104 using condensed moisture from separators 101 or 102.

TABLE 1

|  | No cooler | Air fin cooler without water spray | Air fin cooler with water spray |
| --- | --- | --- | --- |
| Ambient temperature (dry bulb) | 40° C. | Same | Same |
| Ambient wet bulb temperature | 24° C. | Same | Same |
| Gas turbine inlet air flow rate (at wet condition) | 1,528,000 kg/hr | Same | Same |
| Compressor refrigeration power | 4,000 kW | Same | Same |
| Condenser (39) outlet temperature (with propane used as first refrigerant) | 47.8° C. | Same | Same |
| "Wet" air fin outlet temperature (stream 105) | — | 41.5° C. | 32.4° C. |
| Refrigeration Duty of Chiller (53) | 18,000 kW | 19,450 kW | 21,400 kW |
| Temperature of inlet air 70, 71 | 16.1° C. | 14.9° C. | 13.2° C. |
| Moisture condensed in 101 or 102 | 11.1 tons/hr | 12.4 tons/hr | 14.1 tons/hr |
| Power increase (per Gas Processors Suppliers Association) from ambient | 20.8% | 22.0% | 23.5% |
| Heat rate decrease per GPSA from ambient | 7.9% | 8.2% | 8.5% |

As an example of the effectiveness to control the air flow rate of the wet air fin cooler, for the same example above, a wet air fin cooler with a fixed UA (surface area combined with heat transfer coefficients) is used. For this example, the same 40° C. dry bulb, 24° C. wet bulb ambient air is assumed to provide the cooling air for this wet air fin cooler. As a base, the air flow is set to 1,000,000 kg/hr and all of the water condensed from the gas turbine inlet air is used for psychometric cooling of the wet air fin cooler 104. As the water is sprayed onto the air fin tubes or into the air flow stream (or a combination of both), part of the water vaporizes to cool the tubes or the air flow and approaches the wet bulb temperature of the air stream. However, as this water is vaporized, the water content of this wet air stream also increases and so also increases the wet bulb temperature of this wet air stream above the ambient wet bulb temperature. As such, it is not possible to vaporize the water to reach a wet air stream temperature that approaches the ambient wet bulb temperature; the water can only approach the "wet-wet bulb temperature" (WWBT), which is the wet bulb temperature of the ambient air with the moisture added to the gas composition at the local conditions.

Figure 3:
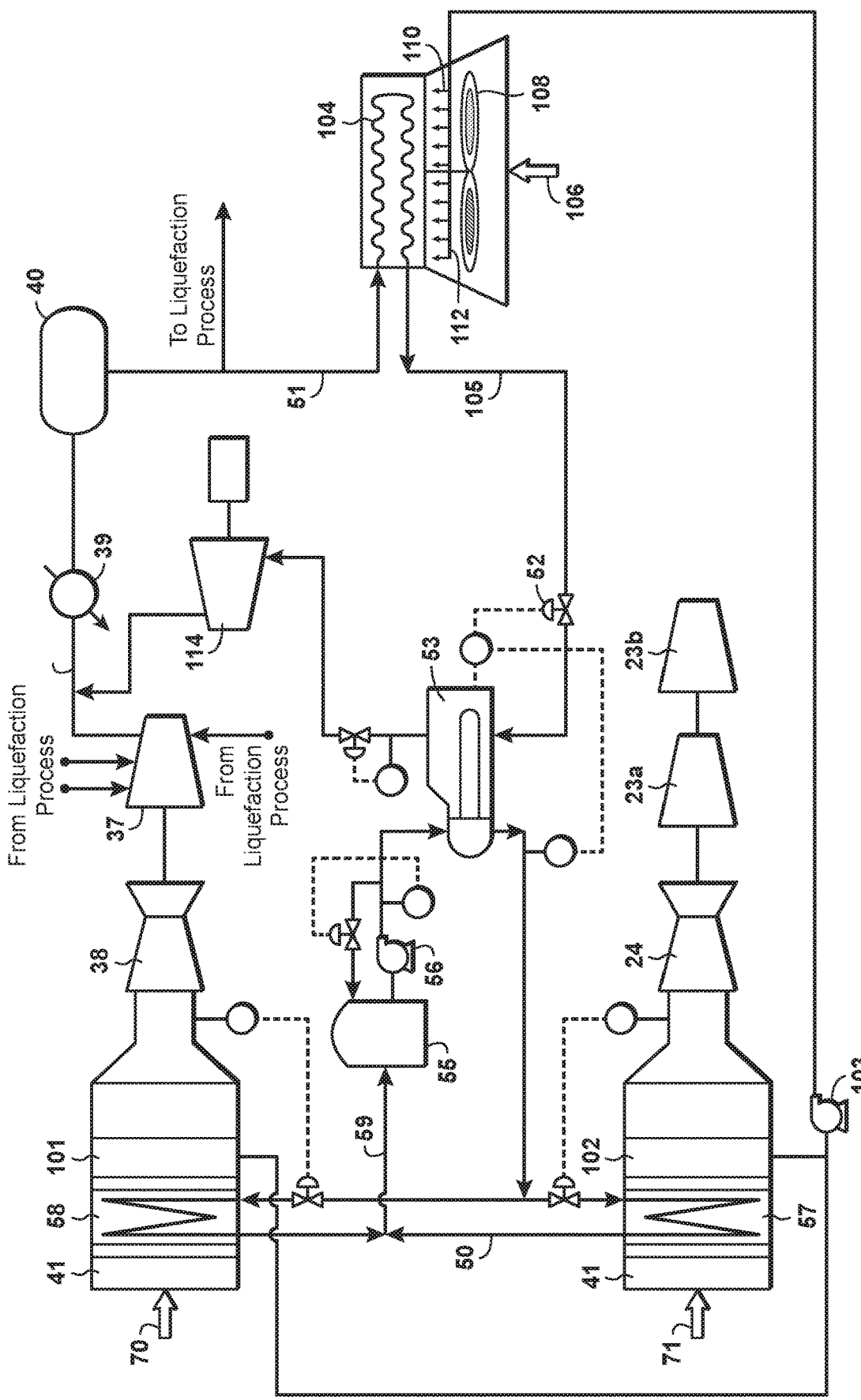
FIG. 3 is a schematic diagram of an inlet air cooling system used with an LNG liquefaction system according to aspects of the present disclosure.

FIG. 3 illustrates an alternative embodiment of the present disclosure that adds a dedicated supplemental compressor 114 to compress the vapor leaving heat exchanger 53 to the pressure similar to the outlet pressure of first refrigerant compressor 37. This may provide an improvement to the system of FIG. 2 to provide control of the inlet air chilling system that is independent of the control of the first refrigerant circuit required to manage the LNG liquefaction system. In order to ensure no icing of the inlet air chillers or inlet air that enters the gas turbine inlet, it may be advantageous to adjust the temperature of the intermediate fluid to ensure that the inlet air temperature can be managed to avoid icing. To control the intermediate fluid temperature, the pressure of the first refrigerant slip-stream leaving heat exchanger 53 may need to be adjusted such that the temperature of the slip-stream is between −5° C. and 20° C. This may be done by use of a control valve at the exit of heat exchanger 53 as shown in FIG. 3. However, it may be more efficient and provide more precise control to adjust the performance of the supplemental compressor 114. This may also be an especially good solution if the inlet air chilling system is retrofitted to an existing LNG liquefaction system.

Figure 4:
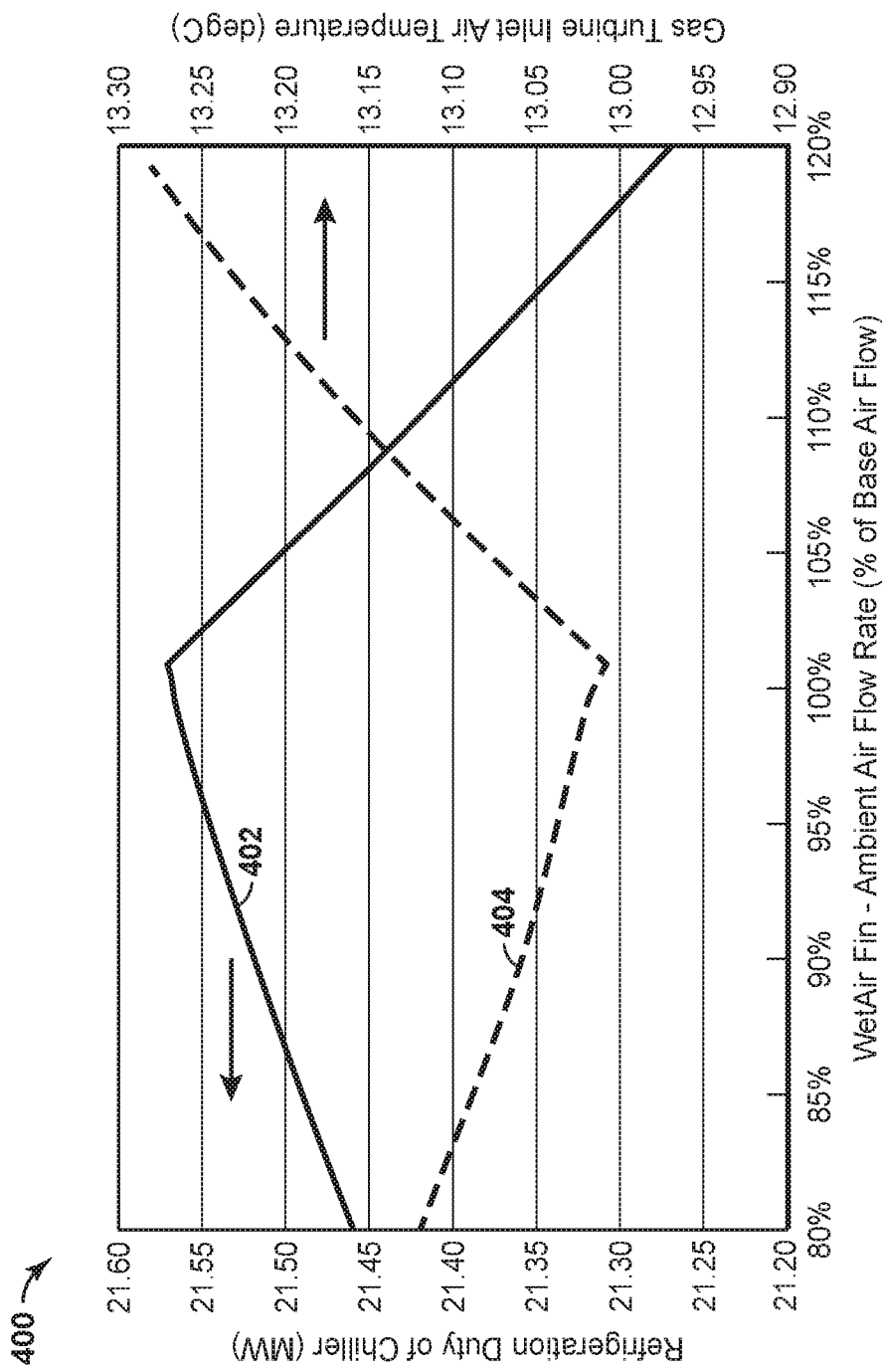
FIG. 4 is a graph showing the relation between refrigeration duty of a chiller, gas turbine inlet air temperature, and ambient air flow rate as a percentage of base air flow, according to aspects of the present disclosure.

FIG. 4 is a chart 400 showing the effect of air flow rate on the effectiveness of the cooling as the wet air fin ambient air flow rate is varied from 80% to 120% of the base value. In this case, any excess moisture not required to reach the WWBT of the air upstream of the wet air fin cooler 104 is neglected or in essence is allowed to drip away. FIG. 4 demonstrates that the maximum refrigeration duty of the chiller 402 is reached at an air flow (about 101% in this example) that corresponds roughly with the full vaporization of the available water supply. This is the optimum air flow required to maximize the refrigeration duty with the restriction that excess moisture is separated upstream of the wet air fin cooler 104. This optimum air flow may be determined by several means, including but not limited to 1) measuring the relative humidity of the air stream after the water spray and targeting about 100% relative humidity; 2) measuring the gas turbine inlet air temperature 404 and performing a real time optimization to minimize the gas turbine inlet temperature by air fin air flow adjustments; 3) measuring the refrigerant outlet temperature from the wet air fin cooler 104 and performing a similar real time optimization; 4) constructing a physics based or empirical model of the system to optimize the air flow across the wet air fin cooler 104; 5) another optimization technique generally known to those skilled in the art or 6) a combination of (1) to (5). Those skilled in the art will understand that a physics based model may be as simple as one that incorporates psychometric air data and at least one of ambient temperature, relative humidity, air fin air flow temperature, barometric pressure, spray water flow rate and spray water temperature to estimate or determine the amount of moisture that can be vaporized into the air fin air flow to reach saturation.

The example in FIG. 4 was restricted to psychometric cooling of the air fin air stream prior to any heating of this air stream by transfer of any heat from stream 51. With an adequate mixing area ahead of the air fin tube bundle, this air stream would be dry but saturated with moisture at the local conditions with any excess moisture separated. However, if the air flow is reduced below the optimum of FIG. 4 and it is assumed that any excess moisture is not separated but rather travels with this air stream, then a new optimum air flow can be determined that is characterized by full vaporization of the available moisture at the local air stream conditions downstream of the air fin bundle. Similar to the original example, this new optimum air flow may be determined by similar techniques as described in (1) to (6) above except that any humidity measurement is preferably performed on the air stream downstream of the wet air fin cooler.

Figure 5:
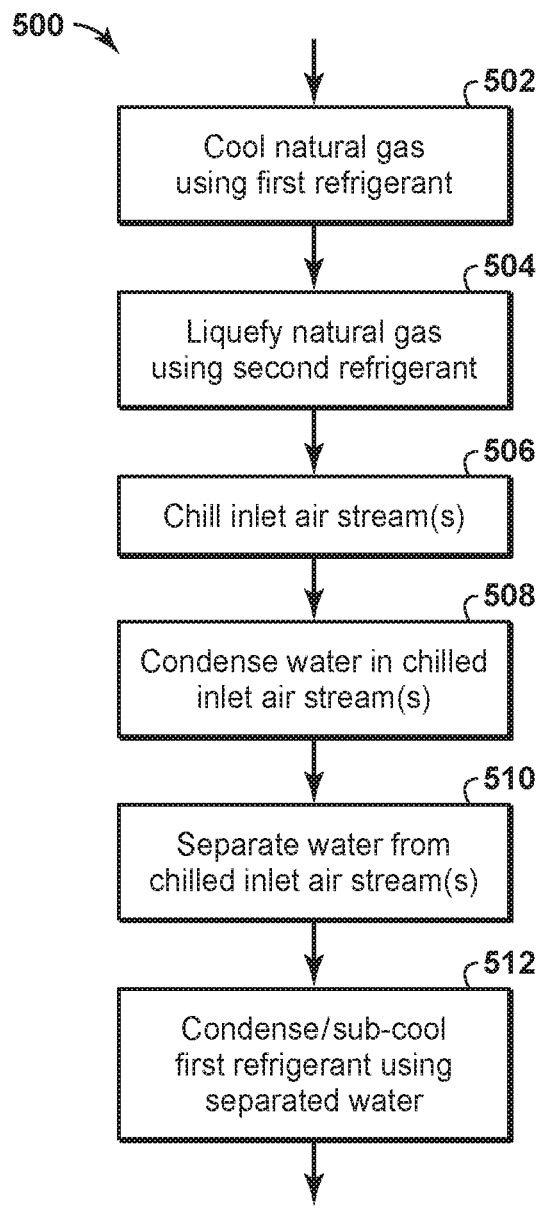
FIG. 5 is a method according to aspects of the present disclosure.

FIG. 5 is a flowchart of a method 500 for processing natural gas to produce liquefied natural gas, according to disclosed aspects. At block 502 the natural gas in one or more heat exchangers is cooled using a first refrigerant from a first refrigerant circuit in which the first refrigerant is compressed in a first compressor driven by a first gas turbine having a first inlet air stream. The first inlet air stream has a dry bulb temperature and a wet bulb temperature. At block 504 the natural gas is liquefied using a second refrigerant. The second refrigerant is compressed in a second compressor driven by a second gas turbine having a second inlet air stream. The second inlet air stream has a dry bulb temperature and a wet bulb temperature. At block 506 at least one of the first and second inlet air streams is chilled from about the respective dry bulb temperature to a temperature below the respective wet bulb temperature. The chilling of at least one of the first and second inlet air streams uses the first refrigerant from the first refrigerant circuit. At block 508 water contained in at least one of the chilled first and second air streams is condensed. At block 510 the condensed water is separated from the at least one of the first and second air streams. At block 512 at least a portion of the first refrigerant is condensed or sub-cooled using the separated water.

Disclosed aspects may include any combinations of the methods and systems shown in the following numbered paragraphs. This is not to be considered a complete listing of all possible aspects, as any number of variations can be envisioned from the description above.

1. A method for processing natural gas to produce liquefied natural gas, the method comprising:
    cooling the natural gas in one or more heat exchangers using a first refrigerant from a first refrigerant circuit in which the first refrigerant is compressed in a first compressor driven by a first gas turbine having a first inlet air stream, the first inlet air stream having a dry bulb temperature and a wet bulb temperature;
    liquefying the natural gas using a second refrigerant, the second refrigerant being compressed in a second compressor driven by a second gas turbine having a second inlet air stream, the second inlet air stream having a dry bulb temperature and a wet bulb temperature;
    chilling at least one of the first and second inlet air streams from about the respective dry bulb temperature to a temperature below the respective wet bulb temperature, wherein the chilling of at least one of the first and second inlet air streams uses the first refrigerant from the first refrigerant circuit;
    condensing water contained in at least one of the chilled first and second air streams;
    separating the condensed water from the at least one of the first and second air streams; and
    condensing or sub-cooling at least a portion of the first refrigerant using the separated water.

2. The method of paragraph 1, wherein condensing or sub-cooling at least a portion of the first refrigerant further comprises:
    spraying the water into an air cooler air stream to vaporize the water within the air cooler air stream; and
    forcing the combined air cooler air stream and vaporized water over or across a tube bundle through which the at least a portion of the first refrigerant passes.

3. The method of paragraph 2, wherein forcing the air cooler air stream is accomplished using a fan.

4. The method of paragraph 3, wherein a flow rate or velocity of the air cooler air stream is adjusted using one or more of a fan speed control, a fan blade pitch control, and a damper adjustment.

5. The method of paragraph 4, wherein the air cooler air stream flow rate or velocity is adjusted based on at least one of: relative humidity of the air cooler air stream, flow rate of water sprayed into the air cooler air stream, ambient temperature, barometric pressure, psychometric air data, ambient relative humidity, air stream temperature, and temperature of the water sprayed into the air cooler air stream.

6. The method of any of paragraphs 1-5, wherein chilling of at least one of the first and second inlet air streams further comprises:
    cooling an intermediate heat transfer fluid using the first refrigerant from the first refrigerant circuit; and
    chilling at least one of the first and second inlet air streams using the intermediate heat transfer fluid.

7. The method of paragraph 6, wherein the intermediate heat transfer fluid comprises water or glycol.

8. The method of any of paragraphs 1-7, wherein an inlet pressure of the first compressor is selected so that a bubble point temperature of the first refrigerant at the inlet pressure of the first compressor is greater than −5° Celsius and less than 20° Celsius.

9. The method of any of paragraphs 1-8, wherein separating the water is accomplished by a separating device selected from an inertial separator, a vane separator, a plenum, and a coalescer.

10. The method of any of paragraphs 1-9, further comprising at least partially filtering at least one of the first and second inlet air streams before cooling the at least one of the first and second inlet air streams.

11. A system for processing natural gas to produce liquefied natural gas, the system comprising:
    one or more heat exchangers;
    a first refrigerant configured to cool the natural gas in the one or more heat exchangers;
    a first compressor driven by a first gas turbine, the first compressor configured to compress the first refrigerant, the first compressor having a first inlet air stream, wherein the first inlet air stream has a dry bulb temperature and a wet bulb temperature associated therewith;
    a second refrigerant configured to liquefy the cooled natural gas in a cryogenic heat exchanger;
    a second compressor driven by a second gas turbine and configured to compress the second refrigerant, the second compressor having a second inlet air stream, wherein the second inlet air stream has a dry bulb temperature and a wet bulb temperature associated therewith;
    a chiller located at an inlet of each of at least one of the first and second gas turbines, the cooler configured to chill, using the first refrigerant, at least one of the first and second inlet air streams from about the respective dry bulb temperature to a temperature below the respective wet bulb temperature;
    a separator located downstream of each chiller and configured to separate water in the chilled at least one of the first and second inlet air streams; and
    a wet air fin cooler that combines the separated water with an air stream to condense or sub-cool at least a portion of the first refrigerant passing through the wet air fin cooler.

12. The system of paragraph 11, wherein the wet air fin cooler comprises:
    a tube bundle through which the at least a portion of the first refrigerant passes;
    a spray header configured to deliver the separated water to the air stream, to thereby vaporize the water within the air stream; and
    a fan that forces the air stream and vaporized water over or across the tube bundle through which the at least a portion of the first refrigerant passes.

13. The system of paragraph 12, further comprising a fan controller that controls at least one of a speed of the fan, a pitch of a blade of the fan, and a damper associated with the fan.

14. The system of any of paragraphs 11-13, further comprising an intermediate heat transfer fluid, wherein the first refrigerant chills the at least one of the first and second inlet air streams through an intermediate heat transfer fluid configured to be cooled by the first refrigerant, and wherein the intermediate heat transfer fluid chills at least one of the first and second inlet air streams.

15. The system of paragraph 14, wherein the intermediate heat transfer fluid comprises water or glycol.

16. The system of any of paragraphs 11-15, further comprising a third compressor that compresses the first refrigerant to an inlet pressure selected so that a bubble point temperature of the first refrigerant at the inlet pressure is greater than −5° Celsius and less than 20° Celsius.

17. The system of any of paragraphs 11-16, wherein the separator is one of an inertial separator, a vane separator, a plenum, and a coalescer.

18. The system of any of paragraphs 11-17, further comprising a filter arranged to at least partially filter at least one of the first and second inlet air streams before the at least one of the first and second inlet air streams is chilled by the chiller.

19. The system of paragraph 18, wherein the filter comprises a moisture barrier.

20. The system of any of paragraphs 11-19, wherein the first refrigerant is propane.

It should be understood that the numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

What is claimed is:
1. A method for processing natural gas to produce liquefied natural gas, the method comprising:
    cooling the natural gas in one or more heat exchangers using a first refrigerant from a first refrigerant circuit in which the first refrigerant is compressed in a first compressor driven by a first gas turbine having a first inlet air stream, the first inlet air stream having a dry bulb temperature and a wet bulb temperature;

liquefying the natural gas using a second refrigerant, the second refrigerant being compressed in a second compressor driven by a second gas turbine having a second inlet air stream, the second inlet air stream having a dry bulb temperature and a wet bulb temperature;

chilling at least one of the first and second inlet air streams from about the respective dry bulb temperature to a temperature below the respective wet bulb temperature, wherein the chilling of at least one of the first and second inlet air streams uses the first refrigerant from the first refrigerant circuit;

condensing water contained in at least one of the chilled first and second air streams;

separating the water from the at least one of the first and second air streams; and condensing or sub-cooling at least a portion of the first refrigerant using the separated water.

2. The method of claim 1, wherein condensing or sub-cooling at least a portion of the first refrigerant further comprises:

spraying the water into an air cooler air stream to vaporize the water within the air cooler air stream; and forcing the combined air cooler air stream and vaporized water over or across a tube bundle through which the at least a portion of the first refrigerant passes.

3. The method of claim 2, wherein forcing the air cooler air stream is accomplished using a fan.

4. The method of claim 3, wherein a flow rate or velocity of the air cooler air stream is adjusted using one or more of a fan speed control and a fan blade pitch control.

5. The method of claim 4, wherein the air cooler air stream flow rate or velocity is adjusted based on at least one of: relative humidity of the air cooler air stream, flow rate of water sprayed into the air cooler air stream, ambient temperature, barometric pressure, psychometric air data, ambient relative humidity, air stream temperature, and temperature of the water sprayed into the air cooler air stream.

6. The method of claim 1, wherein chilling of at least one of the first and second inlet air streams further comprises:

cooling an intermediate heat transfer fluid using the first refrigerant from the first refrigerant circuit; and chilling at least one of the first and second inlet air streams using the intermediate heat transfer fluid.

7. The method of claim 6, wherein the intermediate heat transfer fluid comprises water or glycol.

8. The method of claim 1, wherein an inlet pressure of the first compressor is selected so that a bubble point temperature of the first refrigerant at the inlet pressure of the first compressor is greater than −5° Celsius and less than 20° Celsius.

9. The method of claim 1, wherein separating the water is accomplished by a separating device selected from an inertial separator, a vane separator, a plenum, and a coalescer.

10. The method of claim 1, further comprising at least partially filtering at least one of the first and second inlet air streams before cooling the at least one of the first and second inlet air streams.

11. A system for processing natural gas to produce liquefied natural gas, the system comprising:

one or more heat exchangers;

a first refrigerant configured to cool the natural gas in the one or more heat exchangers;

a first compressor driven by a first gas turbine, the first compressor configured to compress the first refrigerant, the first compressor having a first inlet air stream, wherein the first inlet air stream has a dry bulb temperature and a wet bulb temperature associated therewith;

a second refrigerant configured to liquefy the cooled natural gas in a cryogenic heat exchanger;

a second compressor driven by a second gas turbine and configured to compress the second refrigerant, the second compressor having a second inlet air stream, wherein the second inlet air stream has a dry bulb temperature and a wet bulb temperature associated therewith;

a chiller located at an inlet of each of at least one of the first and second gas turbines, the cooler configured to chill, using the first refrigerant, at least one of the first and second inlet air streams from about the respective dry bulb temperature to a temperature below the respective wet bulb temperature;

a separator located downstream of each chiller and configured to separate water in the chilled at least one of the first and second inlet air streams; and a wet air fin cooler that combines the separated water with an air stream to condense or sub-cool at least a portion of the first refrigerant passing through the wet air fin cooler, wherein the wet air fin cooler comprises a tube bundle through which the at least a portion of the first refrigerant passes;

a spray header configured to deliver the separated water to the air stream, to thereby vaporize the water within the air stream; and a fan that forces the air stream and vaporized water over or across the tube bundle through which the at least a portion of the first refrigerant passes.

12. The system of claim 11, further comprising a fan controller that controls at least one of a speed of the fan and a pitch of a blade of the fan.

13. The system of claim 11, further comprising an intermediate heat transfer fluid, wherein the first refrigerant chills the at least one of the first and second inlet air streams through an intermediate heat transfer fluid configured to be cooled by the first refrigerant, and wherein the intermediate heat transfer fluid chills at least one of the first and second inlet air streams.

14. The system of claim 13, wherein the intermediate heat transfer fluid comprises water or glycol.

15. The system of claim 11, further comprising a third compressor that compresses the first refrigerant to an inlet pressure selected so that a bubble point temperature of the first refrigerant at the inlet pressure is greater than −5° Celsius and less than 20° Celsius.

16. The system of claim 11, wherein the separator is one of an inertial separator, a vane separator, a plenum, and a coalescer.

17. The system of claim 11, further comprising a filter arranged to at least partially filter at least one of the first and second inlet air streams before the at least one of the first and second inlet air streams is chilled by the chiller.

18. The system of claim 17, wherein the filter comprises a moisture barrier.

19. The system of claim 11, wherein the first refrigerant is propane.

* * * * *